US008783766B2

(12) United States Patent
Westerink et al.

(10) Patent No.: US 8,783,766 B2
(45) Date of Patent: Jul. 22, 2014

(54) MODULAR DISPLAY ASSEMBLY

(75) Inventors: Rik Westerink, Corinth, TX (US); Timothy W. Terleski, Richardson, TX (US); Per Magnus Skold, McKinney, TX (US); Alexander Gerard Saucier, Addison, TX (US); Armando Valdes, Denton, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 160 days.

(21) Appl. No.: 13/310,979

(22) Filed: Dec. 5, 2011

(65) Prior Publication Data
US 2012/0139307 A1 Jun. 7, 2012

Related U.S. Application Data

(60) Provisional application No. 61/459,174, filed on Dec. 7, 2010.

(51) Int. Cl.
*A47C 7/72* (2006.01)
(52) U.S. Cl.
USPC ...................................... 297/217.3
(58) Field of Classification Search
USPC ...................................... 297/217.3
See application file for complete search history.

(56) References Cited

U.S. PATENT DOCUMENTS

| 5,529,265 | A  | * | 6/1996  | Sakurai ........................ 244/118.5 |
| 7,762,627 | B2 | * | 7/2010  | Chang ......................... 297/217.3 |
| 7,954,894 | B2 | * | 6/2011  | Schedivy et al. .......... 297/217.3 |
| 8,203,657 | B2 | * | 6/2012  | Vitito ............................ 348/837 |
| 8,449,031 | B2 | * | 5/2013  | Chang ......................... 297/217.3 |
| 2005/0132407 | A1 | * | 6/2005 | Boyer et al. .................... 725/77 |
| 2008/0246320 | A1 |   | 10/2008 | Chang |
| 2010/0162327 | A1 |   | 6/2010  | Bonar |

FOREIGN PATENT DOCUMENTS

| WO | 2008014352 A  | 1/2008 |
| WO | 2011070515 A1 | 6/2011 |
| WO | 2012078495    | 6/2012 |

OTHER PUBLICATIONS

International Search Report and Written Opinion dated Jun. 1, 2012 in related Application No. PCT/US2011/063256.
International Preliminary Report on Patentability dated Jun. 20, 2013 in Application No. PCT/US2011/063256.

* cited by examiner

*Primary Examiner* — Sarah B McPartlin
(74) *Attorney, Agent, or Firm* — Kilpatrick Townsend & Stockton LLP; Tiffany L. Williams, Esq.; Dean W. Russell, Esq.

(57) ABSTRACT

Described are display assemblies having a display coupled to a passenger seat back, a video shroud coupled to the passenger seat back and with an inner opening positioned adjacent the display, wherein a gap is positioned between an outer edge of the display and an edge of the inner opening, and an adaptor having a lip and coupled to the video shroud, wherein the lip is positioned adjacent the gap. A portion of the lip may surround at least the outer edge of the display and/or may overlap a portion of the video shroud.

5 Claims, 4 Drawing Sheets

MODULAR DISPLAY ASSEMBLY

CROSS REFERENCE TO RELATED APPLICATION

This application is related to and claims priority benefits from U.S. Provisional Application Ser. No. 61/459,174, filed on Dec. 7, 2010, entitled BACK MOUNTED MONITOR INSTALLATION. The '174 application is hereby incorporated herein in its entirety by this reference.

FIELD OF THE INVENTION

The invention relates to passenger seats or the like.

BACKGROUND

Many passenger seats such as those on passenger aircraft, buses, trains, and the like are arranged so that each passenger seat, other than the forward-most located passenger seats, faces the back of the next forward passenger seat. To increase a passenger's comfort and enjoyment, many passenger seat backs are utilized to install amenities for the passenger's use during the trip. For example, an upper surface of the seat back may be used to install In-Flight Entertainment ("IFE") equipment or other entertainment devices and/or as an area for additional storage of amenities, such as reading materials or other devices.

Typically, the upper seat back is completely covered by a one-piece protective covering or shroud that surrounds the device attached to the seat back so as to provide a durable surface that protects the device from damage or tampering. Because the shroud is configured to snugly conform to the seat back and the outer perimeter of the device, the shroud must be redesigned or replaced if device shape or size is changed, such as during an upgrade or replacement of the device. Due to the size of the shroud, there is considerable cost involved in replacing or redesigning the shroud for each change to the device.

Thus, it may be desirable to provide a modular shroud that includes a smaller component that may be replaced or redesigned to accommodate changes in sizes and shapes of the device, while allowing a larger portion of the shroud to be standardized for a variety of devices.

SUMMARY

Embodiments of the present invention include a display assembly comprising a display coupled to a passenger seat back, a video shroud coupled to the passenger seat back and comprising an inner opening positioned adjacent the display, wherein a gap is positioned between an outer edge of the display and an edge of the inner opening, and an adaptor comprising a lip and coupled to the video shroud, wherein the lip is positioned adjacent the gap. Other embodiments may further include a passenger seat comprising the passenger seat back.

In some embodiments, a portion of the lip may substantially surround at least the outer edge of the display and/or may overlap a portion of the video shroud. The adaptor and the video shroud may be different colors and/or may be formed of the same materials or different materials. In other embodiments, the display may be an in-flight entertainment display.

According to certain embodiments, a method of configuring the display assembly may comprise uncoupling the video shroud from a passenger seat back, uncoupling the adaptor from the video shroud, coupling a replacement adaptor to the video shroud, and recoupling the video shroud to the passenger seat back. In other embodiments, the method may further comprise uncoupling the display from the passenger seat back before uncoupling the video shroud from the passenger seat back and coupling a replacement display to the passenger seat back after recoupling the video shroud to the passenger seat back.

DETAILED DESCRIPTION

The described embodiments of the invention provide display assemblies for use with passenger seats. While the display assemblies are discussed for use with aircraft seats, they are by no means so limited. Rather, embodiments of the display assemblies may be used in passenger seats or other seats of any type or otherwise as desired.

Figure 1:
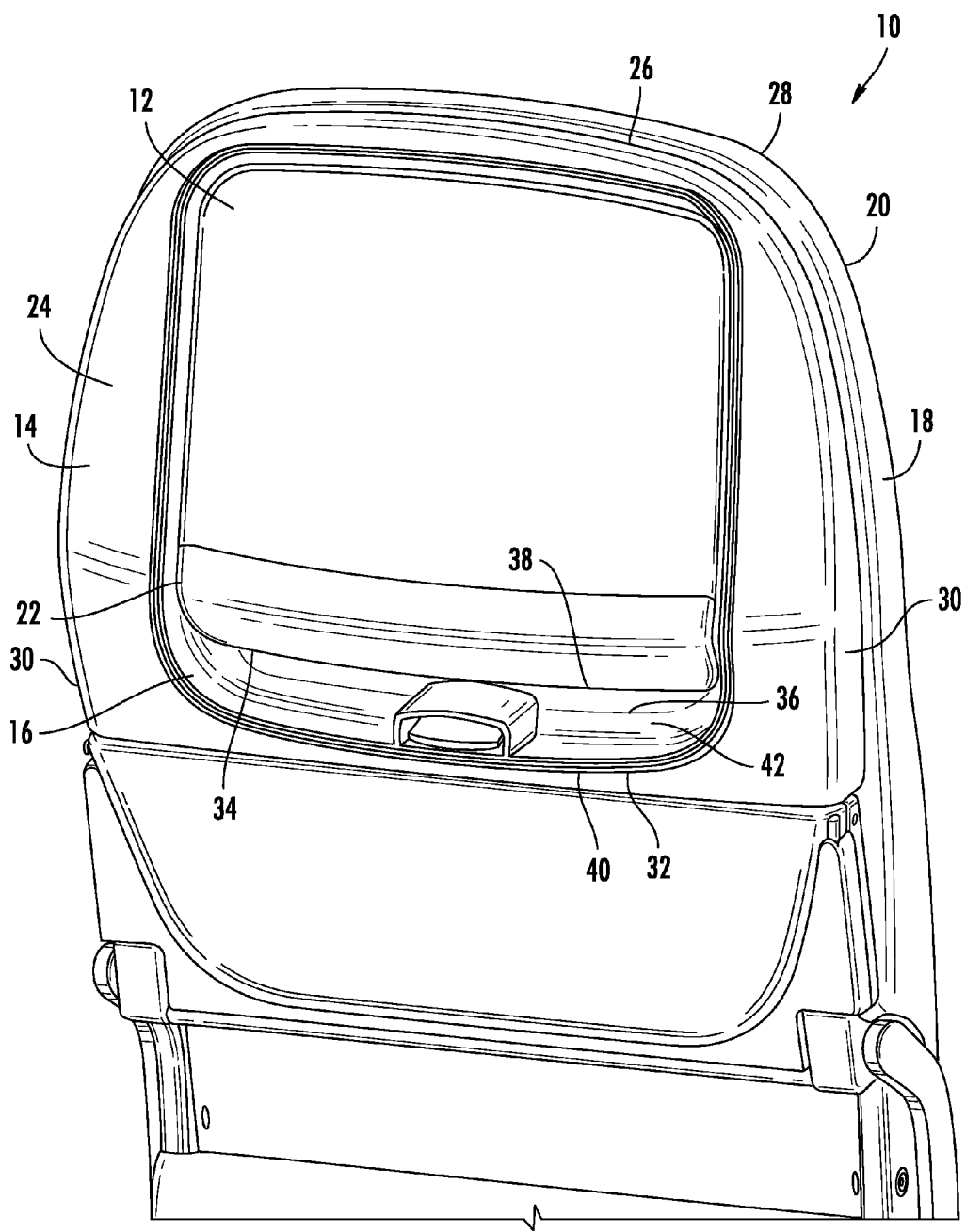
FIG. 1 is a perspective view of a display assembly according to certain embodiments of the present invention.
Figure 2:
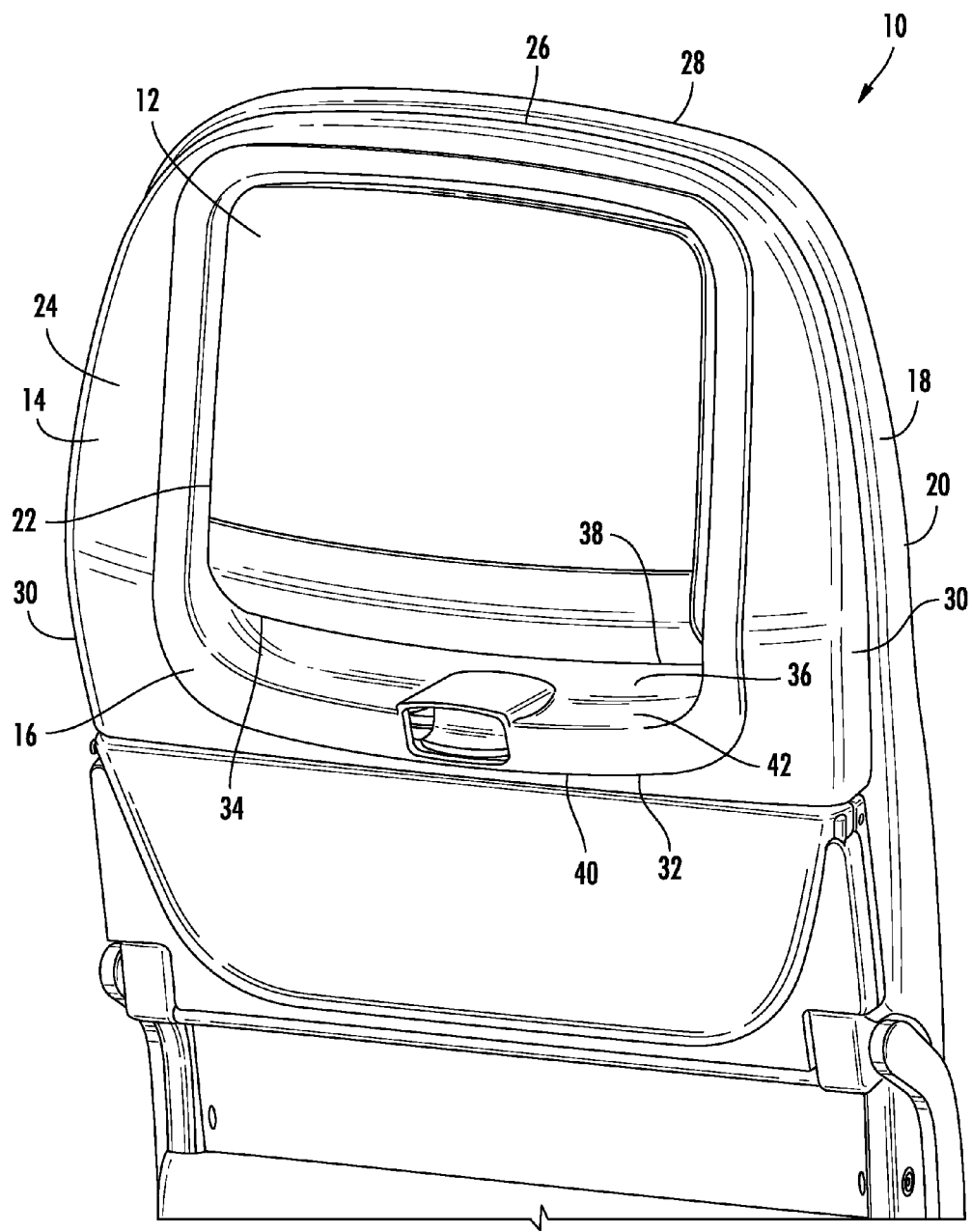
FIG. 2 is a perspective view of the display assembly of FIG. 1 configured for smaller display embodiments.
Figure 3:
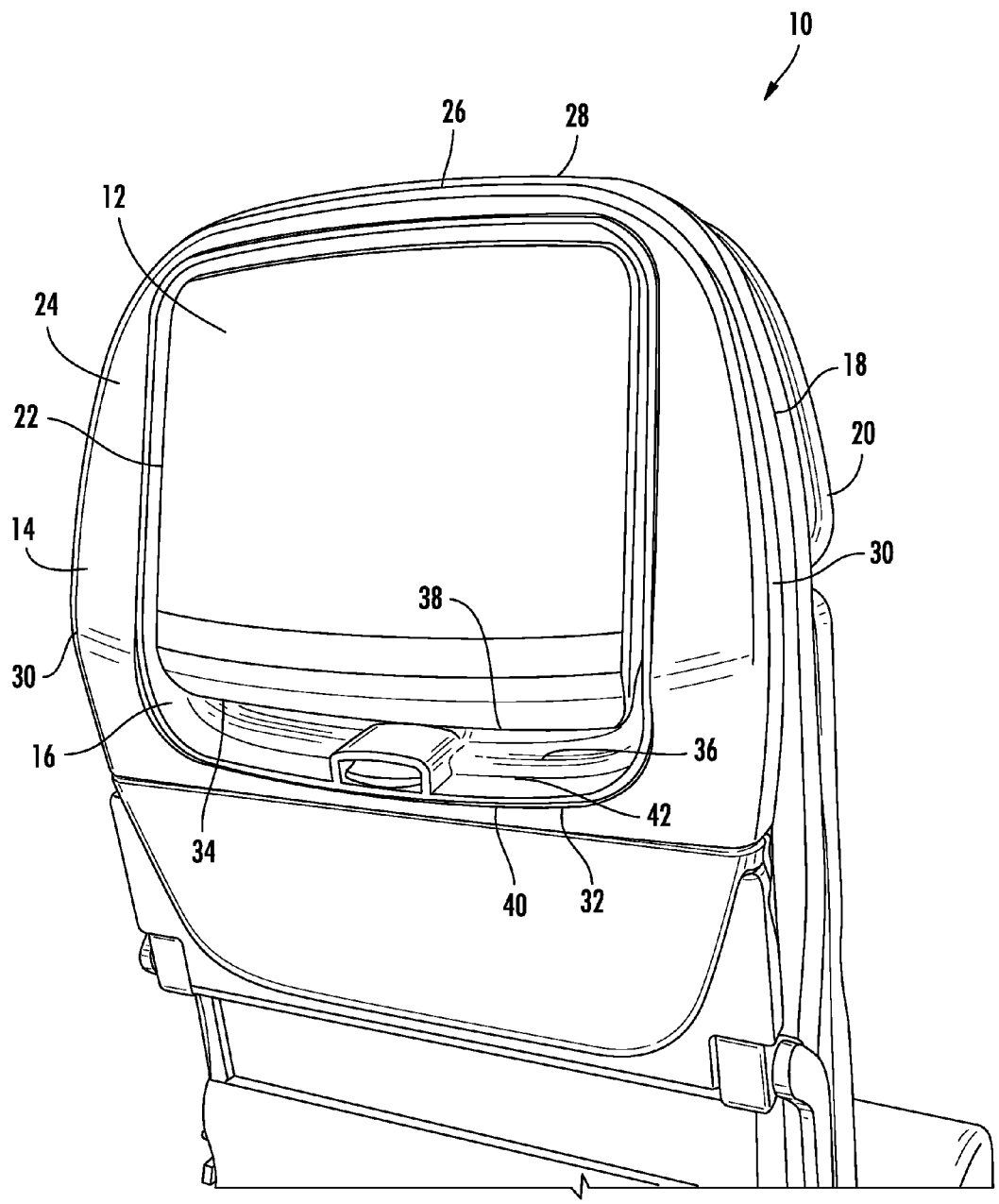
FIG. 3 is a perspective view of the display assembly of FIG. 1 with other display embodiments.
Figure 4:
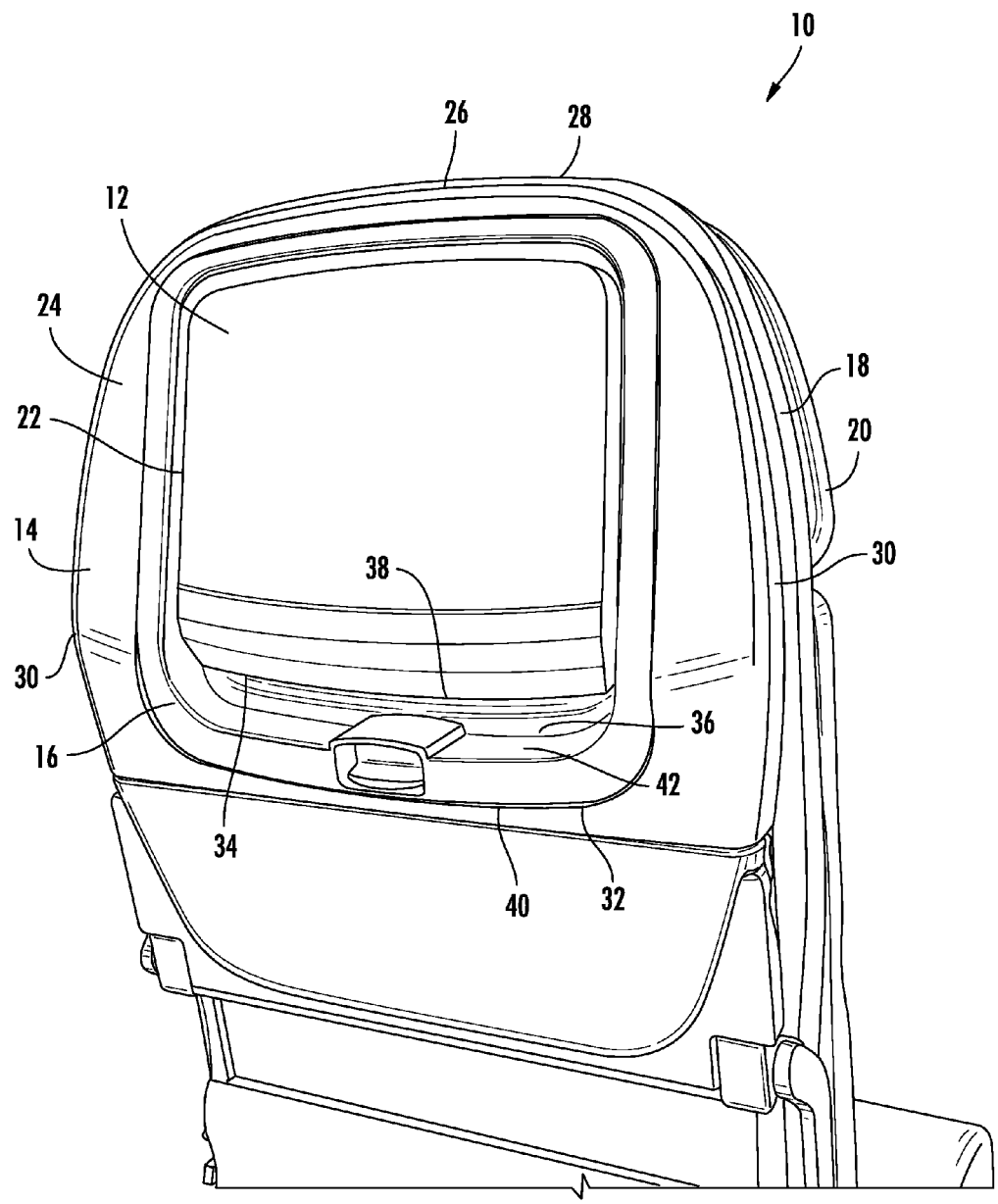
FIG. 4 is a perspective view of the display assembly of FIG. 3 configured for smaller display embodiments.

FIGS. 1-4 illustrate embodiments of a display assembly 10. In these embodiments, the display assembly 10 comprises a display 12, a video shroud 14, and an adaptor 16.

The display 12 may be a display for an IFE or other entertainment devices. In some embodiments, the display 12 is coupled to a back 18 of a passenger seat 20. One of ordinary skill in the relevant art will understand that any suitable coupling technique may be used to attach the display 12 to the back 18 including but not limited to mechanical fasteners such as screws, bolts, rivets, compression fit, or other suitable fasteners.

The display 12 may comprise any suitable outer perimeter shape 22 including but not limited to square, rectilinear, trapezoidal, parabolic, or other suitable shape that does not exceed an outer perimeter 28 of the back 18. In certain embodiments, the back 18 may include a recess that is shaped to accommodate the outer perimeter shape 22 of the display 12 and at least a portion of a depth of the display 12.

As shown in FIGS. 1-4, embodiments of the video shroud 14 may be coupled to the back 18. One of ordinary skill in the relevant art will understand that any suitable coupling technique may be used to attach the video shroud 14 to the back 18 including but not limited to mechanical fasteners such as screws, bolts, rivets, compression fit, or other suitable fasteners. The video shroud 14 may include a surface 24 having a outer shape 26 that corresponds to at least a portion of the outer perimeter 28 of the back 18. The video shroud 14 includes sides 30 that are shaped so that the surface 24 of the video shroud 14 is positioned adjacent and/or aft of the display 12.

The video shroud 14 may be formed of a material that resists stains and is easily and quickly sanitized between passenger uses including but not limited to plastics, such as polycarbonate, polyethylene, polypropylene, polyvinyl chloride, or other similar plastics, metallic materials, composite materials, or other similar materials.

The video shroud 14 may also comprise an inner opening 32. The inner opening 32 may be shaped so that the display 12 is visible through the video shroud 14. Thus, as shown in FIGS. 1-4, the inner opening 32 may have any suitable shape that substantially surrounds or is larger than the outer perimeter shape 22 of the display 12 so that a gap 36 is positioned between an outer edge 38 of the display 12 and an edge 40 of the inner opening 32.

Embodiments of the adaptor 16 may be coupled to the video shroud 14. One of ordinary skill in the relevant art will understand that any suitable coupling technique may be used to releasably couple the adaptor 16 to the video shroud 14 including but not limited to mechanical fasteners such as screws, bolts, rivets, compression fit, or other suitable fasteners. The adaptor 16 includes a lip 42 that surrounds an inner aperture 34.

In some embodiments, as shown in FIGS. 1-4, a portion of the lip 42 may be shaped to substantially surround at least the outer edge 38 of the display 12. The lip 42 may also have a width that spans the gap 36 between the display 12 and the edge 40 of the inner opening 32 of the video shroud 14. In other embodiments, another portion of the lip 42 may be shaped to overlap a portion of an interior side of the surface 24 of the video shroud 14 so that the adaptor 16 is held in place by the video shroud 14.

By incorporating the use of the adaptor 16, the inner opening 32 of the video shroud 14 may be enlarged to accommodate the largest display 12 that may be coupled to the back 18, and the adaptor 16 may be used to enclose the gap 36 between smaller or differently shaped displays 12 and the video shroud 14 without the need to modify or replace the video shroud 14. As a result, when the size or shape of the display 12 changes (as shown in FIGS. 1-4), the display assembly 10 may be disassembled by uncoupling the display 12 and the video shroud 14 from the back 18. Once the video shroud 14 has been removed from the back 18, the adaptor 16 may be uncoupled from the video shroud 14, and a replacement adaptor 16 may be coupled to the existing video shroud 14. The video shroud 14 and the replacement display 12 may then be recoupled to the back 18.

In embodiments where the display 12 has a new size and/or shape (smaller, larger, elongated, narrower, rounder, angled, straight, etc.), the shape of the inner aperture 34 of the replacement adaptor 16 is similarly configured to the new size and/or shape of the replacement display 12, which allows the lip 42 to couple to the standardized shape of the inner opening 32 of the video shroud 14. In other embodiments where the adaptor is a wear part or where a different look for the video shroud 14 is desired, the adaptor 16 may be removed as described above and replaced with a new version of the same adaptor 16 or an adaptor 16 formed of different materials, having a different color, or otherwise having a different look, but with substantially the same dimensions as the current adaptor 16 so that the display 12 may be recoupled to the video shroud 14. Because the adaptor 16 is considerably smaller than the video shroud 14, the adaptor 16 is less expensive to replace. Likewise, retrofitting a new display 12 into an existing video shroud 14 is easier and less expensive because only the adaptor 16 requires replacement.

In other embodiments, the adaptor 16 may be attached to the video shroud 14 through other types of coupling techniques, such as chemical fasteners, adhesion, bonding, fusion welding, co-molding, integral formation, or any other suitable coupling technique that attaches the adaptor 16 to the video shroud 14. In these embodiments, the adaptor 16 and the video shroud 14 may be formed through processes that allow the tooling for the video shroud 14 to be standardized, while using adjustable tooling to form the adaptor 16. As discussed above, because the adaptor 16 is considerably smaller than the video shroud 14, the tooling used to form the adaptor 16 is less expensive to replace.

In certain embodiments, the combination of standardized tooling for the video shroud 14 and adjustable/replacement tooling for the adaptor 16 may be used in a variety of processes. In these embodiments, the adaptor 16 may be formed with a set of tooling that is adjustable or replaceable depending on the size of the adaptor 16 required. The adaptor 16 may then pass through the same manufacturing equipment with standardized video shroud 14 tooling, which molds or otherwise bonds the standardized video shroud 14 to the adaptor 16. The adaptor 16 and the video shroud 14 may also be formed through a two-shot molding process or overmolding process, which also utilize standardized tooling to form the video shroud 14 and adjustable/replacement tooling to form the adaptor 16. In yet other embodiments, the adaptor 16 and the video shroud 14 may be separately formed, and the adaptor 16 and the standardized video shroud 14 may be glued or otherwise chemically bonded. One of ordinary skill in the relevant art will understand that any suitable process may be used to form the video shroud 14 with standardized tooling and the adaptor 16 with adjustable/replacement tooling.

The shape and style of the adaptor 16 may vary depending on the size and shape of the display 12. The lip 42 may have any suitable shape that creates a secure and aesthetically pleasing transition between the display 12 and the video shroud 14. Likewise, the color of the adaptor 16 may differ from either and/or both the display 12 and the video shroud 14 to create a color break without the need for secondary coatings on either the display 12 or the video shroud 14. Moreover, the adaptor 16 may be customized to particular customer preferences without the need to reconfigure the video shroud 14.

The adaptor 16 may also be formed of a material that resists stains and is easily and quickly sanitized between passenger uses including but not limited to plastics, such as polycarbonate, polyethylene, polypropylene, polyvinyl chloride, or other similar plastics, metallic materials, composite materials, or other similar materials. In some embodiments, the adaptor 16 and the video shroud 14 may be formed of substantially the same or similar materials. In other embodiments, the adaptor 16 and the video shroud 14 may be formed of different materials. For example, in some embodiments, the video shroud 14 may be formed of a more durable material, while the adaptor 16 may be formed of a less expensive material or a thinner version of the video shroud 14 material in cases where the adaptor 16 is configured as a disposable or wear part. One of ordinary skill in the relevant art will understand that suitable combination of materials may be used to form the video shroud 14 and the adaptor 16.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A method of configuring a display assembly, the display assembly comprising a display, a video shroud, and an adaptor coupled to the video shroud, the method comprising:
    (a) uncoupling the video shroud from a passenger seat back;
    (b) uncoupling the adaptor from the video shroud;
    (c) coupling a replacement adaptor to the video shroud;
    (d) recoupling the video shroud to the passenger seat back;

(e) uncoupling the display from the passenger seat back before uncoupling the video shroud from the passenger seat back; and (f) coupling a replacement display to the passenger seat back after recoupling the video shroud to the passenger seat back.

2. The method of claim 1, wherein the replacement adaptor and the video shroud are different colors.

3. The method of claim 1, wherein the replacement adaptor and the video shroud are formed of the same materials.

4. The method of claim 1, wherein the replacement adaptor and the video shroud are formed of different materials.

5. The method of claim 1, wherein the replacement display is an in-flight entertainment display.

* * * * *